G. GREENLEE.
WIRE SPOKED WHEEL.
APPLICATION FILED OCT. 17, 1917.
1,302,467.
Patented Apr. 29, 1919.
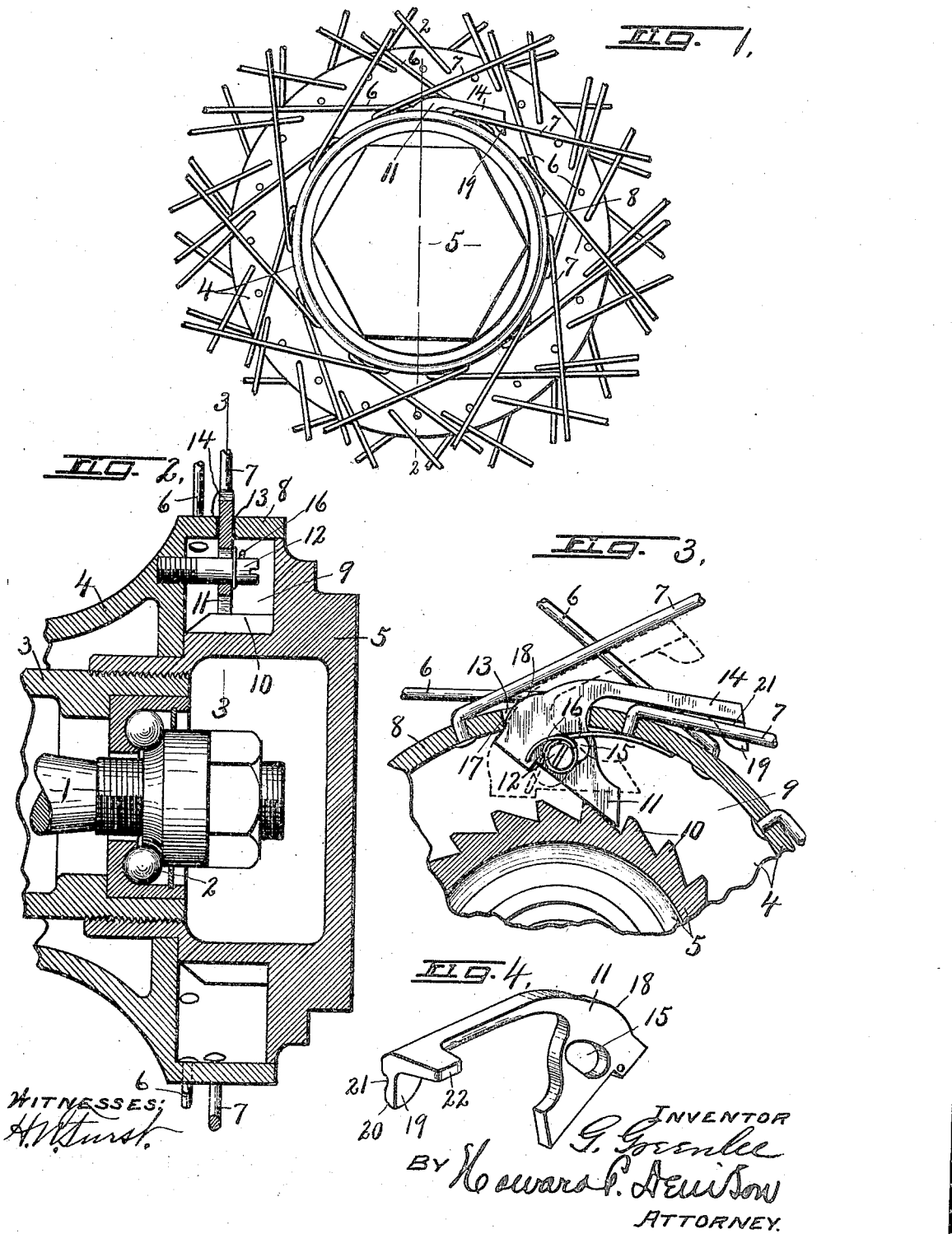

UNITED STATES PATENT OFFICE.

GEORGE GREENLEE, OF GENEVA, NEW YORK, ASSIGNOR TO NATIONAL WIRE WHEEL WORKS, INC., OF GENEVA, NEW YORK, A CORPORATION OF NEW YORK.

WIRE-SPOKED WHEEL.

1,302,467.        Specification of Letters Patent.        Patented Apr. 29, 1919.

Application filed October 17, 1917. Serial No. 197,087.

*To all whom it may concern:*

Be it known that I, GEORGE GREENLEE, a citizen of the United States of America, and resident of Geneva, in the county of Ontario, in the State of New York, have invented new and useful Improvements in Wire-Spoked Wheels, of which the following, taken in connection with the accompanying drawings, is a full, clear, and exact description.

This invention relates to certain improvements in wire spoked wheels having a removable hub section carrying the spokes and felly or rim and held in place upon an inner hub section by means of a screw cap or nut so that by removing the cap, the wheel proper may be removed.

In this class of wheels, suitable means is usually provided for holding the cap against unscrewing or backing off, and in this case it consists of a pawl mounted upon and projecting through an opening in the outer hub section and adapted to engage ratchet teeth on the periphery of the inclosed portion of the cap, the external portion serving as a handle or finger-piece by which the pawl may move to and from its locking position.

The pawl and its operating handle are preferably made in a single piece of cast or stamped metal pivoted or fulcrumed within the outer hub section near the end thereof to which the cap is applied, and one of the objects is to relieve the pivot from shearing strains which may be produced by inadvertently endeavoring to loosen the nut without releasing the pawl by making the hole therein for the pivotal bolt or stud of slightly larger size than the diameter of said pivot, so that it may have in addition to its rocking motion a slight radial motion, and at the same time to cause the heel of the pivot to engage the adjacent wall of the opening through which the pawl extends so that when the ratchet teeth engage the biting point of the pawl, it will tend to force the latter against said wall instead of directly against the pivotal bolt or stud.

Another object is to place the pawl under spring tension in such direction that it will be forced against said wall and permit the use of shoulders on the pawl coöperating with the wall of the opening to yieldingly hold the pawl in either its open or closed positions.

A further object is to place the pawl between and in approximately the same plane as two of the adjacent spokes which extend tangentially in the same direction and to provide the outer end of the pawl with means for frictionally engaging one of the spokes to assist in holding it in its locking position against vibration or rattle, the purpose in locating the pawl within the plane of said spokes being to protect the same against contact with external objects as the wheel is revolving.

Other objects and uses relating to specific parts of the locking device will be brought out in the following description.

In the drawings—

Figure 1 is an end view of the central portion of a wire spoked wheel embodying my invention.

Fig. 2 is an enlarged longitudinal section of the outer end of the wheel, taken on line 2—2, Fig. 1.

Fig. 3 is a detail sectional view of a portion of the outer hub section and cap of the wheel, taken in the plane of line 3—3, Fig. 2, showing the locking device in operative position.

Fig. 4 is a perspective view of the detached pawl.

In order that my invention may be clearly understood, I have shown a portion of one of the front steering wheels having its hub mounted upon an axle stub —1— through the medium of anti-friction bearings —2— and composed of an inner section —3—, an outer section —4— and a cap nut —5— screwing upon the outer end of the inner hub section —3— for holding the outer hub section or wheel proper upon the inner section and permitting its removal when desired without disturbing the inner hub section or its bearings upon the axle —1—.

The outer hub section is connected to a suitable rim, not shown, by reversely arranged sets of tangential spokes —6— and —7— having their inner ends passed through apertures in a cylindrical flange —8— on the outer end of the outer hub section —4— and suitably headed on the inner side of said flange to prevent withdrawal therefrom.

The cap nut —5— is fitted within and against the outer end of the outer hub section —4— to assist in holding the latter in concentric relation to the inner hub section and axle —1— and forms with the outer hub section a chamber —9— in which the means for locking the cap nut in its adjusted position is partially concealed.

This locking mechanism comprises a circumferential series of ratchet teeth —10— on the periphery of the intermediate portion of the cap nut and a one-piece pawl —11— which is fulcrumed on a stud —12— on the outer hub section —4— for engaging the ratchet teeth —10— and holding the cap nut against accidental unscrewing or backing off and also permitting the cap nut to be screwed up tightly or removed at will.

The pawl —11— extends outwardly through a circumferential elongated slot or opening —13— in the flange —8— of the outer hub section —4— between and in approximately the same plane as the inner ends of two of the outer sets of spokes —7— and is provided with an operating handle or finger-piece —14— in said plane to play between the two adjacent spokes referred to.

The stud or pivotal bolt —12— extends parallel with the axis of the wheel through an opening —15— in the pawl —11— between the flange —8— and ratchet teeth —10—, and in addition to its main function of supporting the pawl —11— also serves to receive and support a spring —16— coiled around the stud and having a portion of the same bearing against the inner face of the flange —8— and another portion engaged with the heel of the pawl so as to exert an outward pressure upon the pawl, tending to hold it in engagement with the rear end wall of the opening —13—, and at the same time to yieldingly hold the biting edge of the pawl in engagement with one of the ratchet teeth —10—.

The opening —15— through which the pivotal stud —12— extends is somewhat larger than the diameter of the stud to allow the heel of the pawl to rest against the rear end wall, as —17—, of the opening —13—, so that when the pawl is engaged with the ratchet teeth —10— any tendency of the cap nut to unscrew either accidentally or by the application of a wrench thereto will be resisted by said pawl and thereby transmitted to the shoulder —17— of the outer hub flange —8—, thus obviating shearing strains upon the pivotal stud —12—.

In order that the pawl may clear the ratchet teeth —10— when moved to its released position, as shown by dotted lines in Fig. 3, the heel thereof is provided with a rounding cam face —18— adapted to ride against the end wall —17— of the flange —8— and coöperating with the pivotal stud —12— to produce what may be termed a compound movement of the pawl,—that is, one movement about the axis of the stud —12— and another movement transversely thereof,—the purpose of which is to permit the movement of the pawl to and from its locking position within the space between the two adjacent spokes.

The portions of the pawl —11— at the ends of the cam —18— serve as stops coöperating with the shoulder —17— to frictionally hold the pawl in one or the other of its adjusted positions aided by the spring —16—.

The handle or finger-piece —14— of the pawl is external to and extends circumferentially of the flange —8— of the removable hub section —4— and forms an acute angle with the main body of the pawl of such degree that it will lie substantially parallel with the next adjacent spoke when in its released position, as shown by dotted lines in Fig. 3.

The object in placing the pawl in substantially the same plane as the outer set of spokes —7— is to reduce its liability of contact with external objects and consequent displacement or injury when the wheel is adjusted for use.

The free end of the handle —14— of the pawl is provided with an inwardly projecting lug —19— having a beveled face —20— and a concave seat —21— adjacent the inner side of the contiguous spoke —7— for engaging said spoke and frictionally locking the pawl in its holding position, as shown more clearly in Fig. 3, the same end of the pawl being also provided with a laterally projecting finger-piece —22— preferably on the inner side thereof, by which it may be withdrawn from said holding position.

It is now clear that the pawl forms a diagonal or brace connection between the cap nut and removable hub section,—that is, it is tangential to the portion of the cap nut which it engages at one end, while the opposite end abuts against the shoulder —17— on the hub section, thereby relieving the fulcrum pin or stud —12— from shearing strains in case any attempt should be made to loosen the cap nut without releasing the pawl.

Another advantage is that the pawl and its operating means are made in one piece which materially simplifies the construction and assembling of the wheel, and to a corresponding extent reduces the liability of rattle, the spring —16— acting to always keep the heel of the pawl against the shoulder —17— in all positions of adjustment.

When it is desired to release the cap nut to permit the latter to be unscrewed for removing the outer hub section —4—, it is simply necessary to rock the handle —14— of the pawl outwardly, during which operation the cam face —18— is held against the shoulder —17— by the tension of the spring —16—, while the pawl is being rocked about the axis of the stud —12—.

The ends of the cam incline in opposite directions from the high point thereof which aids the spring in causing the pawl to automatically assume one or the other of its extreme positions after it has been moved a sufficient distance to cause its high point to pass the shoulder —17—, it being understood that the opening —15— for the fulcrum pin —12— is sufficiently larger than the diameter of said pin to permit the pawl to move transversely of the axis of the pin under the action of the cam —18— against the shoulder —17—.

What I claim is:

1. A vehicle wheel having a removable hub section and a cap nut for holding said section against axial displacement, in combination with means for locking the cap nut against unscrewing comprising a ratchet on the cap nut and a pawl fulcrumed on the hub section, and having an independent movement transversely of its fulcrum for engaging said section.

2. A vehicle wheel having a removable hub section and a cap nut for holding said section against axial displacement, in combination with means for locking the cap nut against unscrewing comprising a ratchet on the cap nut and a pawl fulcrumed on the hub section, and having an independent end thrust movement transversely of its fulcrum for engaging said section, and a spring for effecting said end-thrust movement.

3. A vehicle wheel having a removable hub section and reversely arranged sets of tangential spokes and a cap nut for holding said section against axial displacement, in combination with a pawl extending through an opening in the hub section between and in approximately the same plane as two adjacent spokes of one of the sets, said pawl being movable into and out of engagement with the cap nut and provided with an operating handle having means for frictionally engaging one of said two spokes for holding it in its locking position, said pawl having its heel engaged with the adjacent end wall of the opening.

4. A vehicle wheel having a removable hub section and reversely arranged sets of tangential spokes and a cap nut for holding said section against axial displacement, in combination with a pawl extending through an opening in the hub section between and in approximately the same plane as two adjacent spokes of one of the sets, said pawl being movable into and out of engagement with the cap nut and provided with an operating handle having means for frictionally engaging one of said two spokes for holding it in its locking position, and a spring acting upon the pawl to hold the heel of the latter in engagement with the adjacent end wall of the opening.

5. A vehicle wheel having a removable hub section, a cap nut for holding said section against axial displacement, in combination with a pawl pivotally mounted on the removable hub section with a radial lost motion and movable into and out of engagement with the cap nut for holding the latter against unscrewing and for releasing the same, and a spring for imparting a rocking movement to the pawl to engage the cap and also exerting radial pressure on the pawl to force the same against a portion of the removable hub section for yieldingly holding said pawl in its locked and unlocked positions.

In witness whereof I have hereunto set my hand this 29th day of September, 1917.

GEORGE GREENLEE.

Witnesses:
CHARLES F. WARDEN,
HENRY B. GRAVES.

Copies of this patent may be obtained for five cents each, by addressing the "Commissioner of Patents, Washington, D. C."